United States Patent [19]

Griffard et al.

[11] Patent Number: 5,678,959
[45] Date of Patent: Oct. 21, 1997

[54] METHOD OF, AND APPARATUS FOR, REDUCING SCALING IN PNEUMATIC LIME CONVEYING SYSTEMS

[75] Inventors: Randy J. Griffard, St. Mary; Mark G. DeGenova, Ste. Genevieve, both of Mo.

[73] Assignee: Mississippi Lime Company, Alton, Ill.

[21] Appl. No.: 537,084

[22] Filed: Sep. 29, 1995

[51] Int. Cl.$^6$ .................................................. B65G 53/04
[52] U.S. Cl. .......................... 406/122; 406/137; 406/197
[58] Field of Search .............................. 406/122, 137, 406/197, 198, 105, 173

[56] References Cited

U.S. PATENT DOCUMENTS

| | | | |
|---|---|---|---|
| 3,210,127 | 10/1965 | Schaben et al. | 406/173 |
| 4,449,644 | 5/1984 | Matson | 406/137 |
| 4,482,367 | 11/1984 | Howeth | 406/173 |
| 4,496,076 | 1/1985 | Tompkins | 406/137 |
| 4,885,012 | 12/1989 | Thompson | 406/173 |
| 4,988,240 | 1/1991 | Thompson | 406/173 |

FOREIGN PATENT DOCUMENTS

| | | | |
|---|---|---|---|
| 56719 | 4/1985 | Japan | 406/122 |
| 8200451 | 2/1982 | WIPO | 406/173 |

Primary Examiner—Gary C. Hoge
Attorney, Agent, or Firm—Armstrong, Teasdale, Schlafly & Davis

[57] ABSTRACT

An improved pneumatic lime dispensing and conveying system of the type comprising a lime storage container having a dust collector communicating with the storage container for removing dust from the air inside the container and venting the filtered air from the storage container, and a pneumatic conveying system having an air inlet for pneumatically conveying lime dispensed from the storage container through a conveying line. The outlet vent of the dust collector is connected to the air inlet of the pneumatic conveying system to reduce $CO_2$ content of the air, and thereby inhibit scale formation in conveying line. The method of this invention comprises the step of pretreating the air used in the conveying system by exposing it to lime dust to reduce the $CO_2$ content of the air. This is conveniently carried out by drawing the air through a dust filter connected to the lime storage container.

13 Claims, 3 Drawing Sheets

METHOD OF, AND APPARATUS FOR, REDUCING SCALING IN PNEUMATIC LIME CONVEYING SYSTEMS

BACKGROUND AND SUMMARY OF THE INVENTION

This invention relates to a method of, and apparatus for, reducing scaling in pneumatic lime conveying systems.

While pneumatic conveying systems work effectively in conveying lime in high volumes, at low volumes, pneumatic conveying systems can suffer from scaling. Such low volume systems are used in hospital infectious waste incinerators, waste to energy boiler combustion chambers, and casting and reclamation bag houses. This scaling occludes the conduits requiring the system to be shut down while the conduits are cleaned or replaced, and can occur in as little as two or three weeks.

A typical low volume lime dispensing and conveying system might deliver feed rates of 25 to 50 pounds per hour. If these systems were sized using standard air to solids ratios, the conduits would be very small and unreliable. Therefore relatively high volumes of air are used so that the conduits can be made larger. Such low volume system includes a storage container for holding the lime. The storage container typically is provided with a dust collector for removing dust from the air inside the container. The system also includes a dispenser for dispensing lime from the storage container, and a pneumatic conveying system for pneumatically conveying the lime dispensed by the dispenser. The pneumatic conveying system mixes the lime with a high volume of air to conduct the lime through a conduit. With these low volume systems there is a tendency for calcium carbonate scale to form in the conduits, eventually occluding the conduits.

The inventors have discovered that the scaling in low volume lime systems may be due to high concentrations of $CO_2$ in industrial environments, and the relatively high volume of air used. $CO_2$ levels in air vary with wind, pressure, and humidity. Plants located in valleys or depressions may have $CO_2$ levels two to three times higher than normal (typically about 0.033% $CO_2$ by volume). The inventors have discovered that by pretreating air to reduce the $CO_2$ content of the air used in the pneumatic conveying system, scaling can be reduced or eliminated. The inventors have further discovered that a convenient source of pretreated air is available from the dust collector conventionally available on a lime storage container.

Generally, a pneumatic lime dispensing and conveying system of the present invention comprises a lime storage container having a dust collector for removing dust from the air inside the container and venting the filtered air from the storage container. A dispenser dispenses lime from the storage container, and a pneumatic conveying system having an air inlet pneumatically conveys lime, dispensed from the storage container, through a conveying line. The inlet of the pneumatic conveyer is connected to the outlet of the dust collector. Thus the air used in the pneumatic is pretreated by exposure to the lime. To facilitate the treatment of the air, an agitator may be provided to generate lime dust inside the storage container.

Generally, the method of the present invention comprises the step of pretreating the air used in pneumatically conveying lime to reduce the $CO_2$ content of the air. This is conveniently done by mixing the air with lime. In particular, this can be done by connecting the air inlet of the pneumatic conveying system to the air outlet of the dust filter of the storage container. An agitator can be provided to create lime dust inside the storage container, increasing the amount of lime in the dust filter, and increasing the reaction between the air and the lime.

The apparatus and method of this invention reduces scaling in pneumatic lime conveying systems. This increases reliability of the lime supply system and reduces downtime of systems relying upon the lime system. The apparatus can be constructed, and the method implemented, relatively simply and inexpensively.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
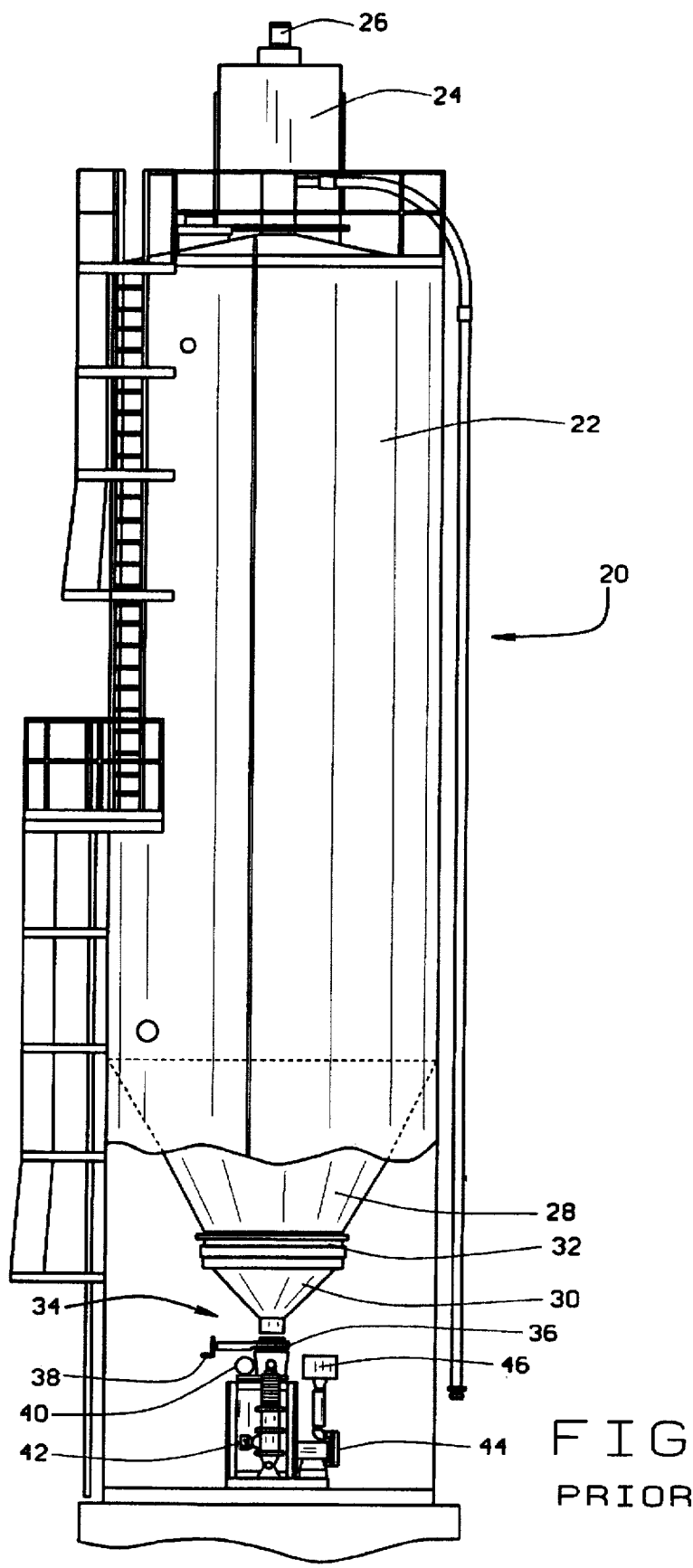
FIG. 1 is a side elevation view of a lime dispensing device of the prior art.

A conventional lime dispensing system of the prior art is indicated generally as 20 in FIG. 1. The system 20 comprises an enclosed silo 22 for storing lime. There is a dust collector 24 at the top of the silo 22 for collecting dust from the silo when the silo is filled. The dust collector may be, for example, a Griffin Environmental Model No. JV-54-4X Jet Pulse Filter, available from Griffin Environmental Co., Inc., Syracuse, N.Y. The collector has a plurality of filter bags, which form a dust collecting surface, connected to a plenum. An exhaust fan 26 is mounted on the dust collector to exhaust air from inside the silo through the dust collector 24.

The dust collector 24 collects lime dust from the air that is displaced from inside the silo 22 when the silo is filled with lime. The silo 22 has a tapered bottom 28 with a generally central opening. The bottom of the silo 22 is preferably equipped with a bin discharger 30, such as a bin activator connected to the silo with a neoprene flex sleeve 32 and driven by a vibrator (not shown). There is a metering and mixing mechanism 34 at the bottom of the silo 22 for metering out lime, and mixing the lime with an air stream to pneumatically convey the lime in a closed conduit. The metering mechanism 34 comprises a slide gate 36, operable with a hand wheel 38, for selectively opening and closing the opening in the bin discharger 30 at the bottom of the silo 22. A volumetric screw feeder 40 meters lime from the silo. This screw feeder 40 may be, for example, a Model DB1C-2 Volumetric Screw Feeder available from Metalfab, Inc., Vernon, N.J., driven by a DC motor. A rotary air lock 42 mixes the lime dispensed by the volumetric screw feeder 40 with an air stream to pneumatically convey the lime. This rotary air lock 42 may be, for example, a rotary air lock with adjustable tips, hard chrome internals, and a vented shear hopper driven by a gear motor available from Rotolock Valves Inc., Monroe, N.C. A blower 44, having an air inlet filter 46, provides the air stream to the rotary air lock 38.

The type of conventional pneumatic lime dispensing system shown in FIG. 1, and described above, has been successfully employed for many years. However, in recent applications where the volume of lime being conveyed is low, and thus the relative amount of air used to convey the lime is high, scaling in the conduits has been encountered. A scale forms on the walls of the conduit and gradually grows in thickness until the conduit is effectively occluded. The inventors believe that this relatively recent phenomenon is a conversion of the lime to $CaCO_3$ as a result of reacting with $CO_2$ in the air, due to of the greater air to lime ratio used in low volume applications. Also, the $CO_2$ content in the air in the industrial environments where lime distribution systems are typically used is generally higher than normal atmospheric conditions.

According to the method of this invention, the air used for pneumatically conveying the lime is pretreated to reduce its $CO_2$ content. This is conveniently done by exposing the air to bulk lime which reacts with the $CO_2$ in the air, thereby reducing the $CO_2$ content. The lime stored in the silo is a convenient source of lime for this pretreatment, and for most applications the accumulation of $CaCO_3$ reaction product in the bulk lime is not a serious problem. Air can be reacted with the lime by drawing the air used to convey the lime through the dust collector 24 of the dispensing system. The dust collector 24 traps lime on its collecting surfaces, and drawing air through these collecting surfaces exposes the air to the lime. The inventors have also discovered that this provides sufficient opportunity for the $CO_2$ in the air to react with the lime. The inventors have discovered that the reaction with the $CO_2$ occurs at such a fast rate that it is necessary to replenish the lime in the dust collector 24, and thus the bulk lime in the silo 22 is purposely disturbed to create dust inside the silo to provide fresh lime dust to the dust collector 24.

Figure 2:
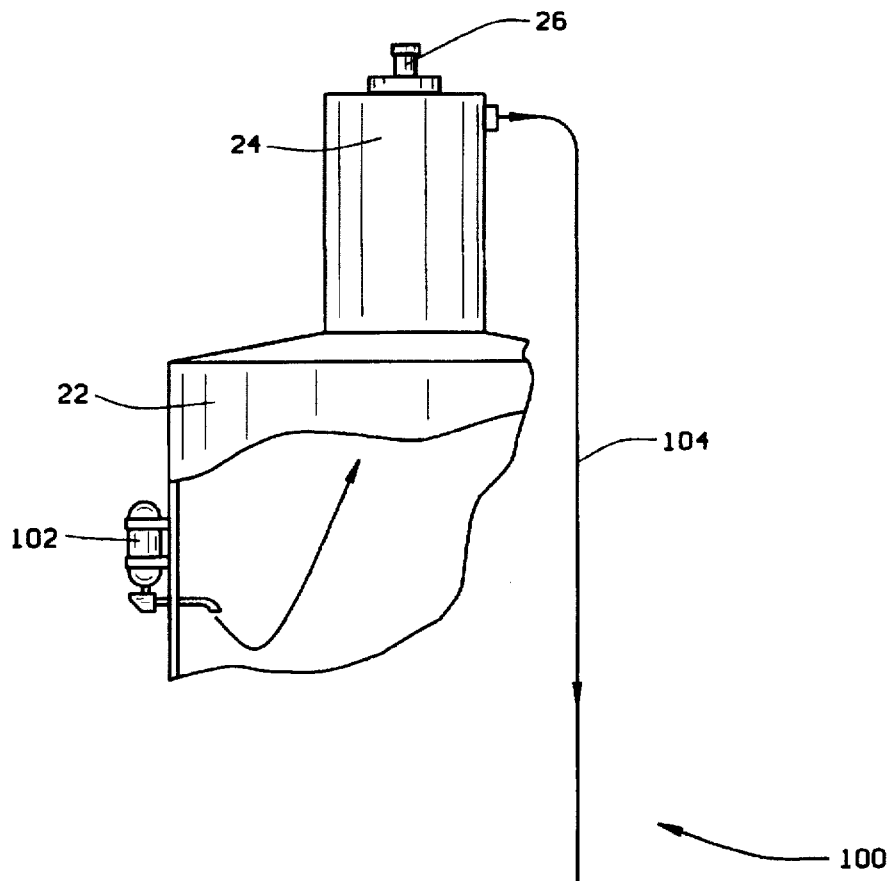
FIG. 2 is a schematic diagram of an improved lime dispensing system constructed according to the principles of this invention.
Figure 2:
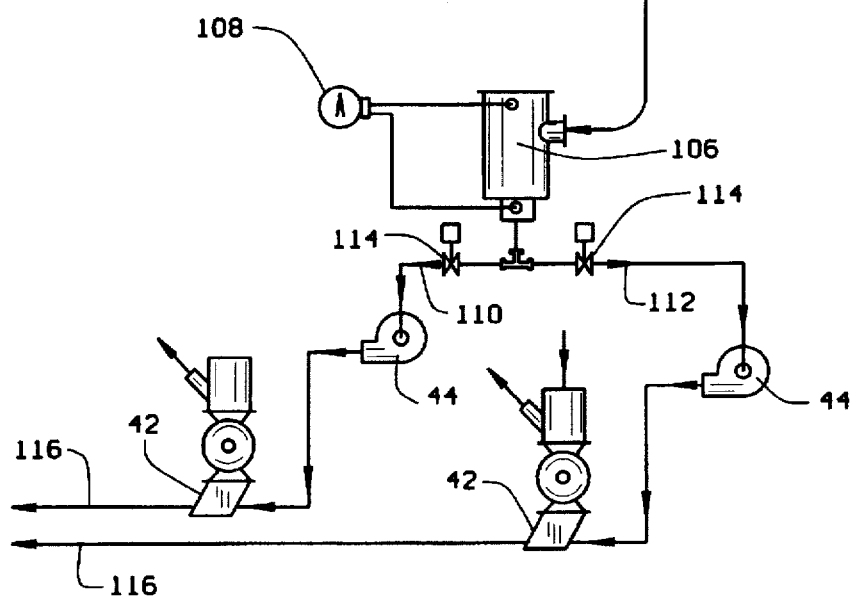

An improved lime dispensing system indicated generally as 100 is shown schematically in FIG. 2. As shown in FIG. 2, the apparatus 100 comprises an air blaster 102 for creating a blast of air inside the silo 22 to create dust in the air space above the bulk lime which can be entrapped by the dust collector to load the collecting surfaces with lime. This air blaster 102 may comprise a Monitor Size 4 Air-Blaster Accumulator Tank, a Monitor #8-8538-AB4 Blast Valve, and a Monitor #8-1126 solenoid valve, all available from Monitor Manufacturing, Elburn, Ill. A conduit 104 is connected to the plenum of the dust collector 24 to draw air through the dust collecting surfaces of the dust collector. The conduit 104 is connected to an in line filter 106 to filter any lime or other particles which could interfere with the blower or the dispensing and mixing equipment, particularly if the filter surface of the dust collector should rupture. A differential pressure sensor 108 measures the pressure drop across the in line filter 106. Conduits 110 and 112 extend from the in line filter 106 to the blower 44, which draw air through the dust collector and provide it to the rotary feeders 42. Valves 114 are provided in conduits 110 and 112. A conduit 116 extends from the rotary feeders to pneumatically convey lime through the conduit.

Figure 3:
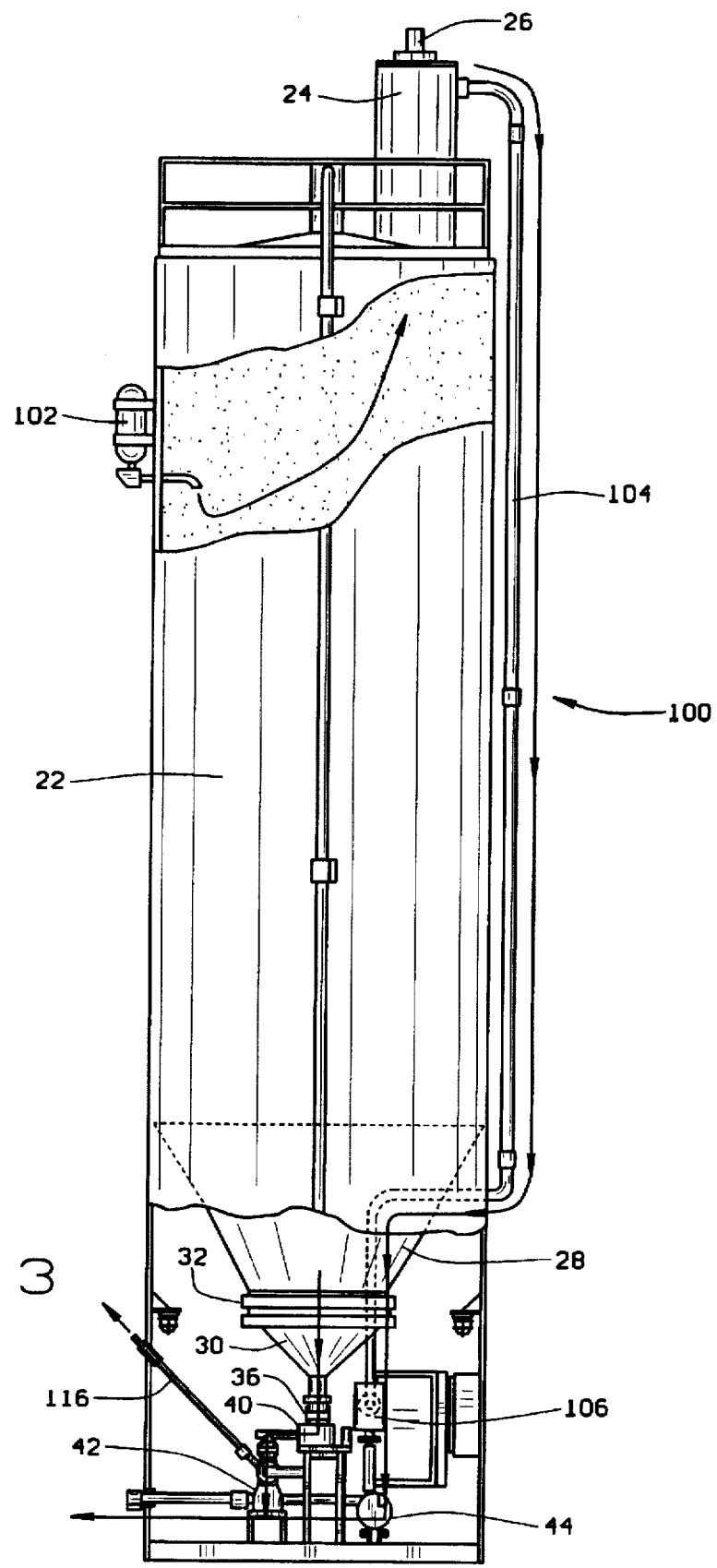
FIG. 3 is a side elevation view of a lime dispensing device constructed according to the principles of the present invention.

An entire pneumatic lime dispensing system constructed according to the principles of this invention is shown in FIG. 3, which is similar in construction to that shown in FIG. 1, and corresponding parts are indicated by corresponding reference numerals. As described above, an air blaster 102 is mounted on the side of the silo 22 for creating a blast of air inside the silo to create lime dust in the air space above the bulk lime to be entrapped in the dust collecting surfaces of the dust collector 24. This air blaster 102 may be, for example, the Moniroe air blaster described above from Monitor Manufacturing, Elburn, Ill.

The dust collector 24 may be a cylindrical filter receiver such as the model No. JV-54-4X Jet Pulse Filter available from Griffin Environmental Co., Inc., Syracuse, N.Y. The conduit 104 extends from the plenum of the dust collector to the in line air filter 106. Blower 44 draws air through the dust collector 24 through conduit 104 to the air filter 106. The air passes through the filter 106 and is conducted to the rotary air lock 42, which mixes the lime dispensed by the volumetric screw feeder 40 with the pretreated air stream to pneumatically convey the lime in the lime conduit 116.

OPERATION

In operation, the air blaster 102 periodically blasts air to disturb the lime in the silo 22 and create a lime dust inside the silo. The blower 26 on the dust collector 24 is operated in coordination with the air blaster to collect the lime dust on the dust collecting surfaces of the dust collector. For example, the air blaster may be triggered every five minutes, and the fan 26 is preferably timed to run for one to three minutes after each blast. The blower 44 then draws air through the dust collector 24 through the conduit 104 and through the filter 106, which removes particles from the air. The blower 44 forces the pretreated air to the rotary air lock 44, which mixes lime with the air stream and pneumatically conveys the lime through the conduit 116.

The pretreatment of the air by passing over the lime trapped on the dust collecting element of the dust collector reduces the $CO_2$ content of the air, reducing the formation of scale in the conduit 116, even at relatively high air to lime ratios. The dust collector 24 is periodically pulsed with compressed air to remove accumulated $CaCO_3$ formed on the dust collecting surfaces by the reaction of the $CO_2$ in the air with the lime. This pulse can be triggered at predetermined intervals, or it can be triggered some other way, for example when the pressure drop across the collecting surfaces (or the load on the blower 44) reaches some predetermined level. A pressure drop of 14–15 inches of water has been found to be a satisfactory level to trigger the pulse cleaning of the collector surfaces. This $CaCO_3$, in the form of small particles falls harmlessly into the bulk lime inside the silo 22, where it is dispensed with the lime from the silo. After the dust collector is pulsed, the air blaster 102 is operated to create a blast of air inside the silo 22 to create lime dust in the air space above the bulk lime which can be entrapped by the dust collector to load the collecting surfaces with lime. Once fresh lime has been collected on the collecting surfaces of the dust collector 24, the blower 44 is operated to draw air through the collecting surfaces of the dust collector.

This pretreated air is drawn through conduit 104, through the filter 106 where particulate impurities are removed, and then to the rotary air lock which mixes the pretreated air with lime to pneumatically carry the lime in the conduit 116. 30%–40% reductions in $CO_2$ levels can routinely be achieved, with drops up to 60% having been measured. The inventors expect that drops up to 80% can be achieved. Because of the reduction in $CO_2$ content of the pretreated air, there is less chance of scaling, even at the high air to lime ratios in low volume systems. Moreover, the pretreatment can also reduce water content. Approximately 10% of the scaling in pneumatic lime conveying systems may be due to reaction of water in the air with the lime to form a scale that is 80–90% calcium hydroxide. Pretreatment with lime reduces $CO_2$ content and moisture, inhibiting both types of scale.

What is claimed:

1. An improved pneumatic lime dispensing and conveying system of the type comprising a lime storage container having a dust collector communicating with the storage container for removing dust from the air inside the container and venting the filtered air from the storage container, and a pneumatic conveying system having an air inlet for pneumatically conveying lime dispensed from the storage container through a conveying line, the improvement comprising connecting the outlet vent of the dust collector to the inlet of the pneumatic conveying system to reduce scale formation in the conveying line, and wherein the system further comprises an agitator for creating a lime dust within the storage container to lead the dust filter with lime dust.

2. The improved pneumatic lime dispensing and conveying system according to claim 1 wherein the agitator comprises an air cannon.

3. A method for reducing the formation of scale in a pneumatic lime conveying system, the method comprising the step of pretreating the air used in the conveying system by exposing it to lime dust to reduce the $CO_2$ content of the air.

4. A method for pneumatically conveying lime from a lime storage container having a dust collector that removes dust from the air inside the container and venting the filtered air from the storage container, the method comprising the step of drawing filtered air from the dust collector for pneumatically conveying lime.

5. The method according to claim 4 further comprising the step of agitating the lime in the storage container to create lime dust inside the storage container.

6. A method for pneumatically conveying lime from a lime storage container, the method comprising a step of pretreating the air used to convey the lime by exposing the air to lime dust to reduce the $CO_2$ content of the air and then conveying the lime.

7. A pneumatic lime dispensing and conveying system comprising a lime storage container, a dust collector communicating with the storage container for removing dust from the air inside the container and venting the filtered air from the storage container, a dispenser for dispensing lime from the storage container, and a pneumatic conveying system connected to the dust collector to draw air from the outlet of the dust collector and to pneumatically convey lime dispensed from the storage container through a conveying line, and wherein the system further comprises an agitator for agitating the lime in the storage container to create lime dust in the container.

8. The pneumatic lime dispensing and conveying system according to claim 7, wherein the agitator comprises an air cannon.

9. A method for controlling the development of scale in a lime dispensing and conveying system, the method comprising pretreating the air used in the conveying system by mixing the air with lime and passing it through a dust filter.

10. A pneumatic lime dispensing and conveying system comprising a lime storage container, a dispenser for dispensing lime from the storage container, a pneumatic conveying system for pneumatically conveying lime dispensed from the storage container, an air pretreater for removing $CO_2$ from the air, and an air supply line for providing the air from the pretreater to the supply line providing pretreated air to the pneumatic conveying system.

11. The pneumatic lime dispenser and conveying system according to claim 10 wherein the pretreater reacts the air with lime to react with the air to reduce $CO_2$ content in the air.

12. The pneumatic lime dispenser and conveying system according to claim 11 wherein the pretreater comprises a dust filter for removing dust from air in the storage container.

13. The pneumatic lime dispenser and conveying system according to claim 12 further comprising an agitator for creating lime dust.

* * * * *